United States Patent

Warwaruk

[11] Patent Number: 5,746,157
[45] Date of Patent: May 5, 1998

[54] VEHICLE-MOUNTED ANIMAL RESTRAINT APPARATUS

[76] Inventor: Robin Warwaruk, Box 1224, Unity, Saskatchewan, Canada, S0K 4L0

[21] Appl. No.: 711,105

[22] Filed: Sep. 9, 1996

[51] Int. Cl.⁶ .................................................. A01K 3/00
[52] U.S. Cl. ...................................................... 119/785
[58] Field of Search ................................. 119/784, 785

[56] References Cited

U.S. PATENT DOCUMENTS

| | | |
|---|---|---|
| 4,252,084 | 2/1981 | Willow . |
| 4,676,198 | 6/1987 | Murray . |
| 4,827,876 | 5/1989 | Krekelberg . |
| 4,899,694 | 2/1990 | Belluomini . |
| 4,947,801 | 8/1990 | Glass . |
| 5,343,032 | 8/1994 | Carrero . |

*Primary Examiner*—Thomas Price

[57] ABSTRACT

An animal restraint apparatus is attached to a horizontal surface and includes a guide unit which includes a carriage-retention channel. A carriage unit is received by the carriage-retention channel of the guide unit. The carriage unit includes a main body portion, a wheel assembly connected to a portion of the main body portion encompassed by the carriage-retention channel of the guide unit, and an animal connector connected to the main body portion. Attachment means connect the guide unit to the horizontal surface. The wheel assembly includes a pair of axles received by the main body portion of the carriage unit. Two pairs of wheels are connected to ends of the pair of axles. The carriage-retention channel of the guide unit includes a base portion. A pair of side walls project upward from the base portion. A pair of ridges project toward each other from top portions of the side walls. A pair of end walls are connected to longitudinal ends of the side walls and the base portion. The attachment means includes fastener-receiving apertures in the base portion of the guide unit and screws received by the fastener-receiving apertures. The screws are screwed into the horizontal surface. The guide unit includes a pair of plow portions connected to the main body portion for plowing top edges of the side walls.

1 Claim, 2 Drawing Sheets

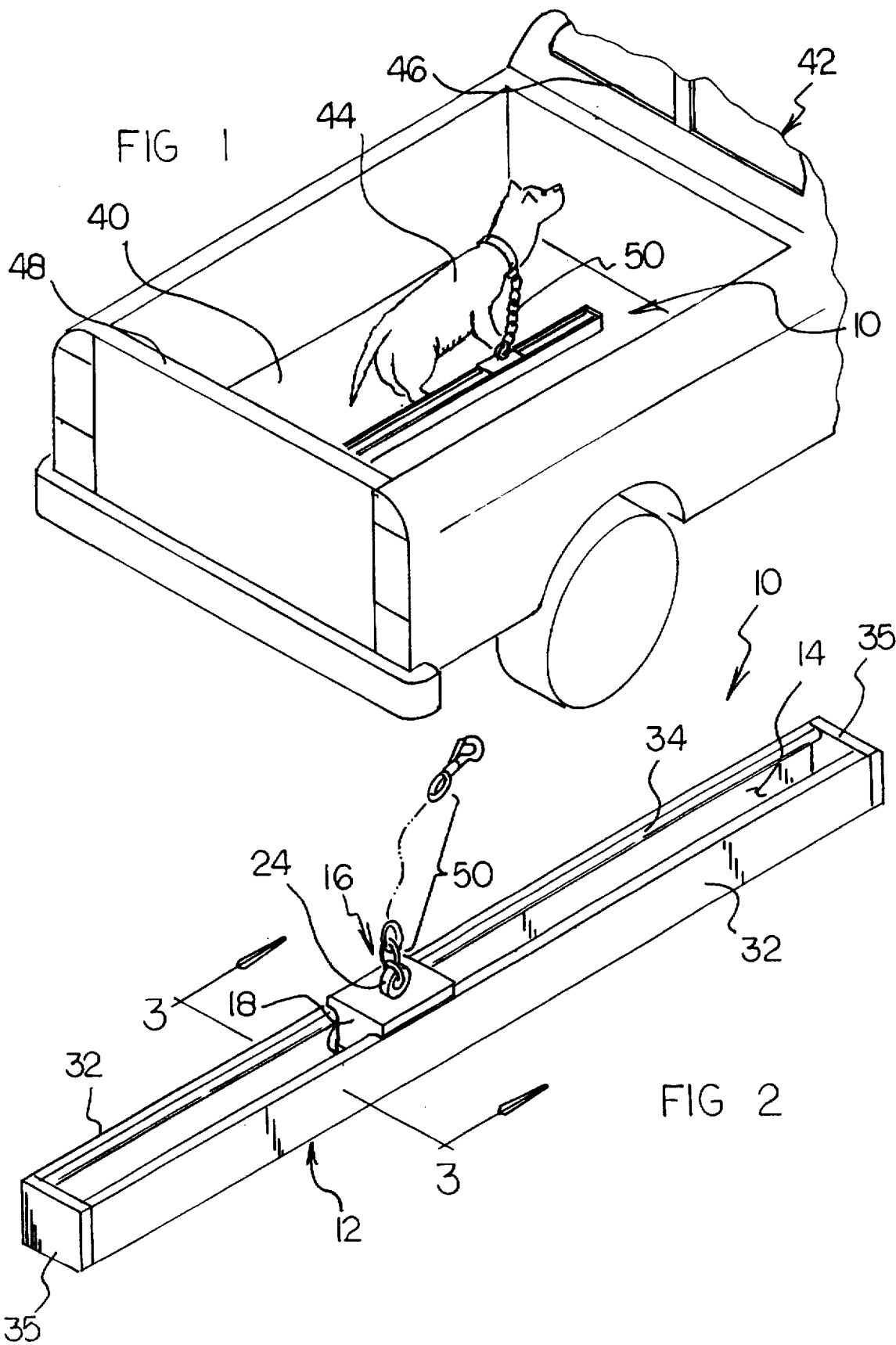

5,746,157

VEHICLE-MOUNTED ANIMAL RESTRAINT APPARATUS

BACKGROUND OF THE INVENTION

1. Field of the Invention

The present invention relates generally to devices for retraining the movement of animals and, more particularly, to animal restraining devices that are mounted in vehicles.

2. Description of the Prior Art

Animals are often carried on vehicles along with persons. Vehicles such as trucks have flat beds, and animals, such as dogs, are often placed on the flat beds when the vehicle is driven. With some dogs, there may be a tendency for the dog to jump off of the flat bed of the vehicle. This can be disastrous, especially if the vehicle is moving. To prevent this occurrence, throughout the years, a number of innovations have been developed relating to restraining animals when carried on flat beds of vehicles, and the following are representative of some of those innovations: U.S. Pat. Nos. 4,252,084, 4,676,198, 4,827,876, 4,899,694, 4,947,801, and Des. 343,032. More specifically, each of U.S. Pat. Nos. 4,252,084, 4,827,876, 4,899,694, 4,947,801, and Des. 343,032 discloses an animal restraint device which is supported by side walls of a pickup truck. In each device, portions of the device traverse a portion of the load-carrying volume of the pickup truck from one side wall to another side wall. As a result, for each such device, a portion of the load-carrying volume of the pickup truck is precluded from being used for carrying a load which has a height that is greater than the height of the side walls. To avoid such a reduction of useful carrying space in a pickup truck, it would be desirable if a vehicle-mounted animal restraint device were provided which does not traverse a portion of the load-carrying volume of the pickup truck from one side wall to another side wall. U.S. Pat. No. 4,676,198 may be of interest for its disclosure of another device for transporting an animal in a vehicle.

Among the patents cited above, U.S. Pat. No. 4,827,876 discloses a vehicle-mounted animal restraint device which includes a tether connected to a lateral support using a ring-like structure that slides along the lateral support. Quite a bit of friction can result from the ring-like structure sliding along the lateral support when a restrained animal moves from side to side. The friction can result in accelerated wear and tear of both the ring-like structure and the lateral support. In this respect, it would be desirable if a vehicle-mounted animal restraint device were provided that had rollers to reduce friction and accompanying wear and tear when a restrained animal moves back and forth on the vehicle.

Still other features would be desirable in a vehicle-mounted animal restraint apparatus. For example, if a dog is carried on the flat bed of a pickup truck, it would be desirable if the dog would be allowed to walk on the flat bed without being restrained to a sitting or lying position. To avoid interfering with the side walls of a pickup truck, it would be desirable if a vehicle-mounted animal restraint were mounted on the bed of a pickup truck.

When the bed of a pickup truck is empty, it would be desirable if a vehicle-mounted animal restraint device permitted a restrained animal to walk back and forth from the cab of the truck to the tailgate.

Thus, while the foregoing body of prior art indicates it to be well known to use vehicle-mounted animal restraint devices, the prior art described above does not teach or suggest a vehicle-mounted animal restraint apparatus which has the following combination of desirable features: (1) does not traverse a portion of the load-carrying volume of a pickup truck from one side wall to another side wall; (2) permits an animal to walk on a flat bed of a truck without being restrained to a sitting or lying position; (3) is mounted on the bed of a truck; (4) permits a restrained animal to walk back and forth from the cab to the tailgate of a pickup truck; and (5) has rollers to reduce friction and accompanying wear and tear when a restrained animal moves back and forth on the vehicle. The foregoing desired characteristics are provided by the unique vehicle-mounted animal restraint apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides an animal restraint apparatus which is attached to a horizontal surface and which includes a guide unit which includes a carriage-retention channel. A carriage unit is received by the carriage-retention channel of the guide unit. The carriage unit includes a main body portion, a wheel assembly connected to a portion of the main body portion encompassed by the carriage-retention channel of the guide unit, and an animal connector connected to the main body portion. Attachment means connect the guide unit to the horizontal surface.

The wheel assembly includes a pair of axles received by the main body portion of the carriage unit. Two pairs of wheels are connected to ends of the pair of axles. The carriage-retention channel of the guide unit includes a base portion. A pair of side walls project upward from the base portion. A pair of ridges project toward each other from top portions of the side walls. A pair of end walls are connected to longitudinal ends of the side walls and the base portion. The attachment means includes fastener-receiving apertures in the base portion of the guide unit and screws received by the fastener-receiving apertures. The screws are screwed into the horizontal surface. The guide unit includes a pair of plow portions connected to the main body portion for plowing top edges of the side walls.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicle-mounted animal restraint apparatus which has all of the advantages of the prior art and none of the disadvantages.

It is another object of the present invention to provide a new and improved vehicle-mounted animal restraint apparatus which may be easily and efficiently manufactured and marketed.

It is a further object of the present invention to provide a new and improved vehicle-mounted animal restraint apparatus which is of durable and reliable construction.

An even further object of the present invention is to provide a new and improved vehicle-mounted animal restraint apparatus which is susceptible of a low cost of manufacture with regard to both materials and labor, and which accordingly is then susceptible of low prices of sale to the consuming public, thereby making such vehicle-mounted animal restraint apparatus available to the buying public.

Still yet a further object of the present invention is to provide a new and improved vehicle-mounted animal restraint apparatus which does not traverse a portion of the load-carrying volume of a pickup truck from one side wall to another side wall.

Still another object of the present invention is to provide a new and improved vehicle-mounted animal restraint apparatus that permits an animal to walk on a flat bed of a truck without being restrained to a sitting or lying position.

Yet another object of the present invention is to provide a new and improved vehicle-mounted animal restraint apparatus which is mounted on the bed of a truck.

Even another object of the present invention is to provide a new and improved vehicle-mounted animal restraint apparatus that permits a restrained animal to walk back and forth from the cab to the tailgate of a pickup truck.

Still a further object of the present invention is to provide a new and improved vehicle-mounted animal restraint apparatus which has rollers to reduce friction and accompanying wear and tear when a restrained animal moves back and forth on the vehicle.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a preferred embodiment of the vehicle-mounted animal restraint apparatus of the invention in use with a dog on the bed of a pickup truck.

FIG. 2 is an enlarged perspective cross-sectional view of the embodiment of the invention shown in FIG. 1 removed from the pickup truck and detached from the dog.

DESCRIPTION OF THE PREFERRED EMBODIMENT

Figure 3:
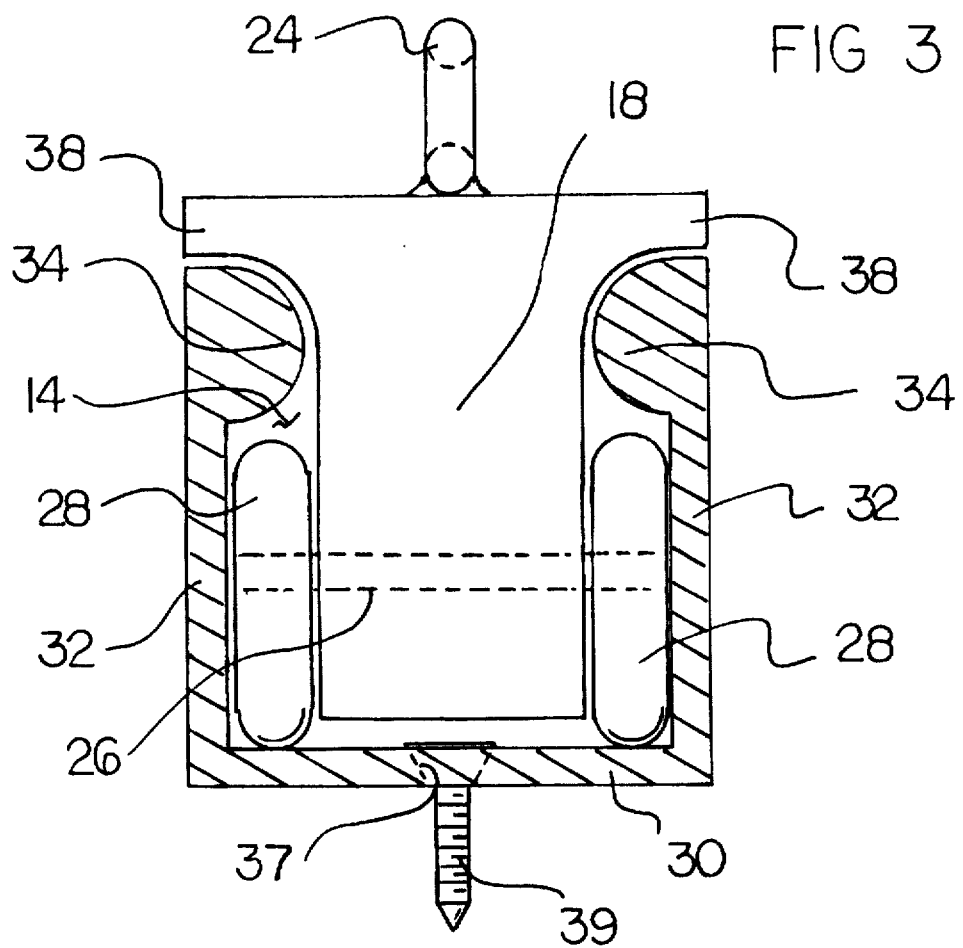
FIG. 3 is an enlarged cross-sectional view of the embodiment of the invention shown in FIG. 2 taken along line 3—3 thereof
Figure 4:
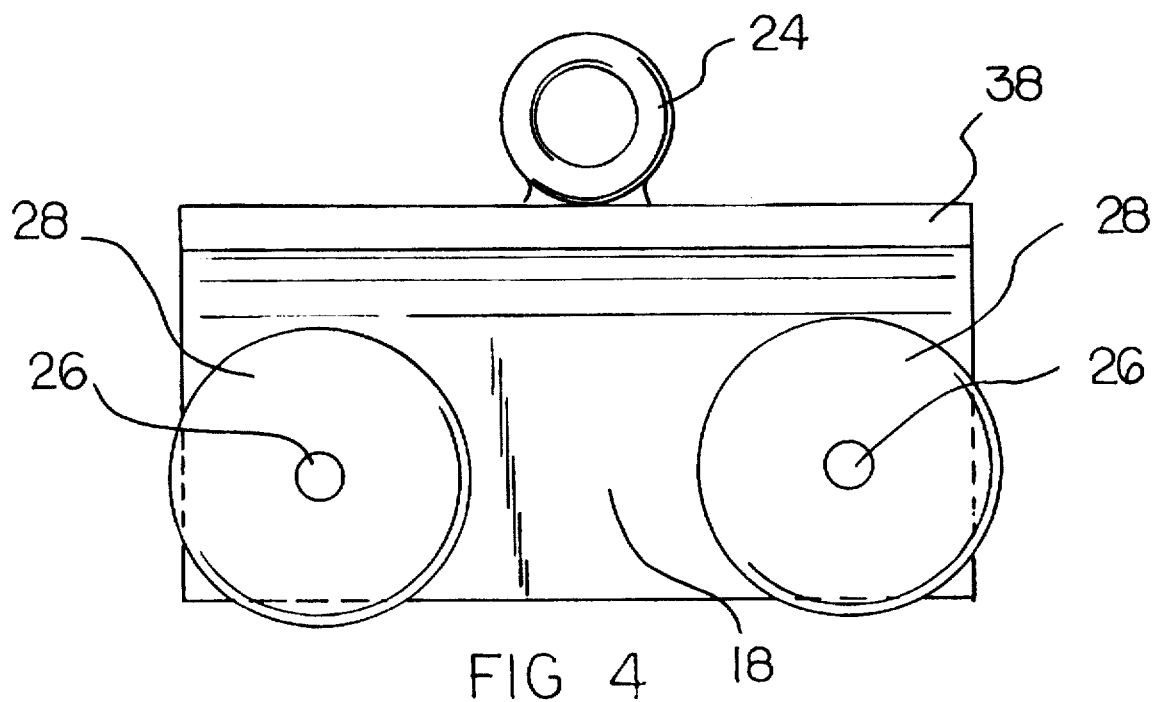
FIG. 4 is a side view of the carriage portion of the embodiment of the invention shown in FIG. 3 removed from the guide channel of the invention.

With reference to the drawings, a new and improved vehicle-mounted animal restraint apparatus embodying the principles and concepts of the present invention will be described.

Turning to FIGS. 1–4, there is shown an exemplary embodiment of the vehicle-mounted animal restraint apparatus of the invention generally designated by reference numeral 10. In its preferred form, animal restraint apparatus 10 is vehicle mounted on a horizontal surface of the vehicle and includes a guide unit 12 which includes a carriage-retention channel 14. A carriage unit 16 is received by the carriage-retention channel 14 of the guide unit 12. The carriage unit 16 includes a main body portion 18, a wheel assembly connected to a portion of the main body portion 18 encompassed by the carriage-retention channel 14 of the guide unit 12 and an animal connector 24 connected to the main body portion 18. Attachment means connect the guide unit 12 to the horizontal surface.

The wheel assembly includes a pair of axles 26 received by the main body portion 18 of the carriage unit 16. Two pairs of wheels 28 is connected to ends of the pair of axles 26. The carriage-retention channel 14 of the guide unit 12 includes a base portion 30. A pair of side walls 32 project upward from the base portion 30. A pair of ridges 34 project toward each other from top portions of the side walls 32. A pair of end walls 35 are connected to longitudinal ends of the side walls 32 and the base portion 30. The ridges 34 prevent the carriage unit 16 from being lifted out from the guide unit 12. The attachment means includes fastener-receiving apertures 37 in the base portion 30 of the guide unit 12 and screws 39 received by the fastener-receiving apertures 37. The screws 39 are screwed into the horizontal surface. The guide unit 12 includes a pair of plow portions 38 connected to the main body portion 18 for plowing top edges of the side walls 32. The plow portions 38 help clear miscellaneous objects or large articles of dirt from the top edges of the side walls 32 when the animal moves back and forth while attached to the animal restraint apparatus 10 of the invention. As shown in FIG. 3, the pair of ridges 34 of the carriage-retention channel 14 project toward each other from the top portions of the side walls 32. The ridges are each preferably semi-cylindrical in cross section and include a semi-cylindrical side wall having a convex outer surface (not labeled). The convex outer surfaces of the ridges face inwardly toward each other, as also shown in FIG. 3. Preferably, the wheels 28 are positioned for engagement against the convex outer surfaces of the semi-cylindrical side walls of the ridges 34. As such, an upward movement of a first side of the carriage unit 12 within the carriage-retention channel 14 will cause a first pair of the wheels on the first side of the carriage unit to engage the convex outer surface of the semi-cylindrical side wall of one of the ridges. This engagement will cause the carriage unit 14 to move towards an opposed side wall 32, thereby causing a second pair of the wheels 28 to engage the opposed side wall to retard movement of the carriage unit 12 within the carriage-retention channel 14.

In making the animal restraint apparatus 10 of the invention, the carriage unit 16 is inserted in the carriage-retention channel 14 before the end walls 35 of the guide unit 12 are attached to the longitudinal ends of the side walls 32 and the base portion 30.

To install the animal restraint apparatus 10 in a bed 40 of a pickup truck 42, such as shown in FIG. 1, the guide unit 12 is positioned on the bed 40 at a desired location so that the dog 44 can move back and forth between the cab 46 and the tailgate 48 of the pickup truck 42. The carriage unit 16 is moved aside to expose the fastener-receiving apertures 37 of the base portion 30 of the guide unit 12. The threaded portion of screws 39 are placed through the fastener-receiving apertures 37 and screwed into the bed 40.

To use the animal restraint apparatus 10 with an animal, for example a dog 44, a collar or a harness is attached to the dog 44 shown in FIG. 1. One end of a leash, a chain 50, or other suitable flexible tether is attached to the dog collar or harness by conventional means. The other end of the leash, the chain 50, or other suitable flexible tether is attached to the animal connector 24 on the carriage unit 16 by any suitable conventional means, such as a selectively connectable chain link.

It is understood that the horizontal surface can be a bed of another type of trucks. Moreover, the horizontal surface can any suitable horizontal surface, not part of any vehicle at all, such as a portion of the ground.

The components of the vehicle-mounted animal restraint apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved vehicle-mounted animal restraint apparatus that is low in cost, relatively simple in design and operation, and which may advantageously be used without traversing a portion of the load-carrying volume of a pickup truck from one side wall to another side wall. With the invention, a vehicle-mounted animal restraint apparatus is provided which permits an animal to walk on a flat bed of a truck without being restrained to a sitting or lying position. With the invention, a vehicle-mounted animal restraint apparatus is provided which is mounted on the bed of a truck. With the invention, a vehicle-mounted animal restraint apparatus is provided which permits a restrained animal to walk back and forth from the cab to the tailgate of a pickup truck. With the invention, a vehicle-mounted animal restraint apparatus is provided which has rollers to reduce friction and accompanying wear and tear when a restrained animal moves back and forth on the vehicle.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. An animal restraint apparatus for attachment to a horizontal surface comprising:

a carriage-retention channel including a base portion, a pair of spaced side walls projecting upward from the base portion, and a pair of ridges projecting toward each other from top portions of the side walls, the ridges each being semi-cylindrical in cross section and including a semi-cylindrical side wall having a convex outer surface, the convex outer surfaces of the ridges facing inwardly toward each other;

a carriage unit received by the carriage-retention channel, wherein the carriage unit includes a main body portion, a wheel assembly connected to a portion of the main body portion encompassed by the carriage-retention channel, and an animal connector connected to the main body portion;

wherein the wheel assembly includes a pair of axles received by the main body portion of the carriage unit, and two pairs of wheels connected to ends of the pair of axles, the wheels being positioned for engagement against the convex outer surfaces of the semi-cylindrical side walls such that an upward movement of a first side of the carriage unit within the carriage-retention channel will cause a first pair of the wheels on the first side of the carriage unit to engage the convex outer surface of the semi-cylindrical side wall of one of the ridges and cause the carriage unit to move towards an opposed side wall, thereby causing a second pair of the wheels to engage the opposed side wall to retard movement of the carriage unit within the carriage-retention channel;

attachment means for connecting the carriage-retention channel to the horizontal surface.

* * * * *